United States Patent [19]

Martin et al.

[11] Patent Number: 4,479,624
[45] Date of Patent: Oct. 30, 1984

[54] PARACHUTE RISER ASSEMBLY

[75] Inventors: Michael A. Martin; Bruce W. Trenholm; James G. Woolley, all of Ridgecrest, Calif.

[73] Assignee: The United States of America as represented by the Secretary of the Navy, Washington, D.C.

[21] Appl. No.: 410,283

[22] Filed: Aug. 23, 1982

[51] Int. Cl.³ .............................................. B64D 17/24
[52] U.S. Cl. .................................................... 244/152
[58] Field of Search ............... 244/152, 151 R, 151 A, 244/151 B, 142, 145, 147, 148

[56] References Cited

U.S. PATENT DOCUMENTS

| 3,498,565 | 3/1970 | Nash-Boulden | 244/152 |
| 3,779,489 | 12/1973 | Matsuo | 244/152 |
| 3,829,045 | 8/1974 | Snyder | 244/152 |
| 3,866,862 | 2/1975 | Snyder | 244/152 |
| 3,958,780 | 5/1976 | Matsuo et al. | 244/152 |
| 4,262,865 | 4/1981 | Smith | 244/147 |
| 4,279,393 | 7/1981 | Spinks | 244/152 |

*Primary Examiner*—Galen L. Barefoot
*Attorney, Agent, or Firm*—Robert F. Beers; W. Thom Skeer; Stephen J. Church

[57] ABSTRACT

A seat-mounted parachute has control lines positioned on seat-held risers to enclose the lines to permit deployment through the seat rollers without entanglement.

2 Claims, 5 Drawing Figures

Fig. 2B
Fig. 2A
Fig. 4
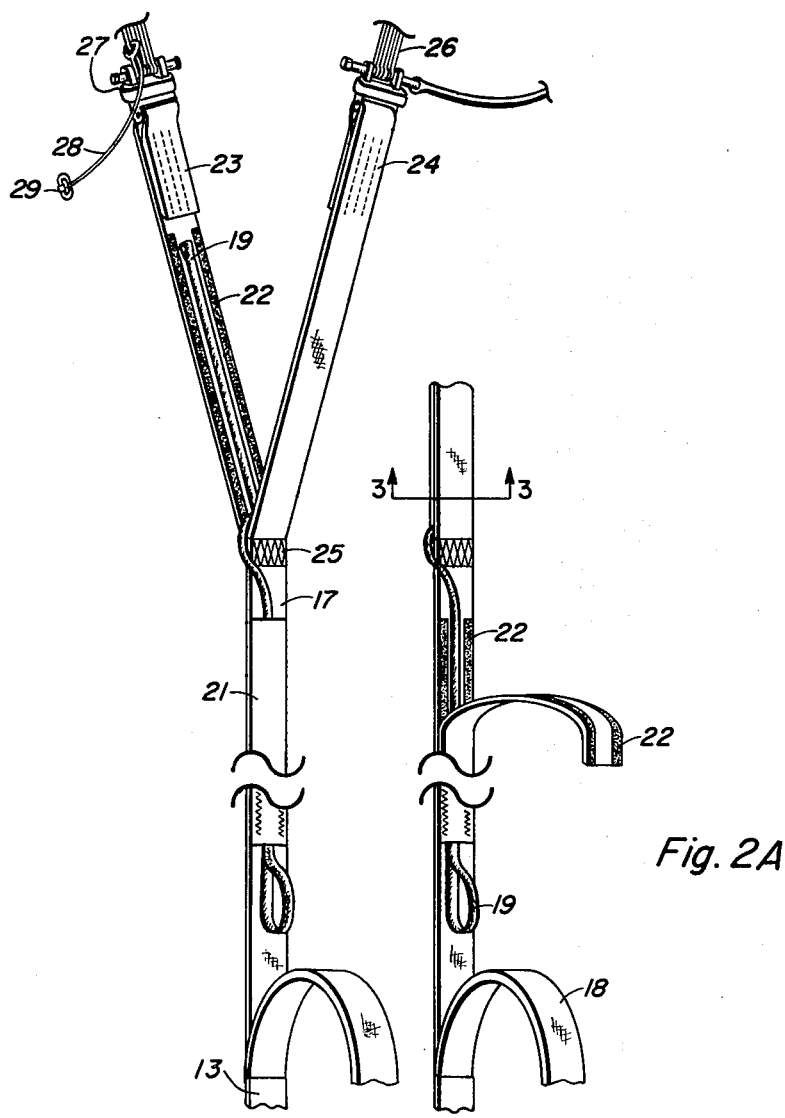
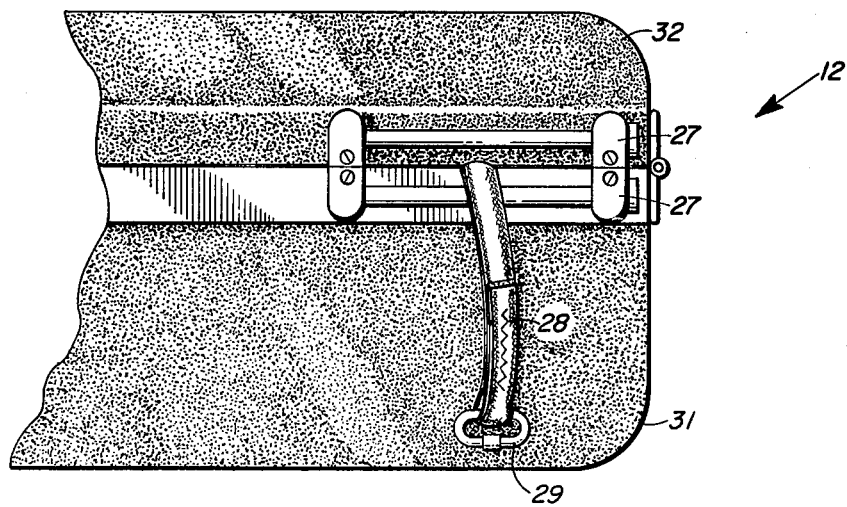

PARACHUTE RISER ASSEMBLY

BACKGROUND OF THE INVENTION

1. Field of the Invention

This invention pertains to the field of air safety. More particularly, the invention pertains to the field of parachutes. In still greater particularity, the invention pertains to the type of parachute which is mounted on the seat of the aviator.

2. Description of the Prior Art

Parachutes which mount on the aircraft seat mechanism are well known. Likewise, parachutes which may be converted from hemispherical canopies to modified hemispheres for gliding are well known, see, for example, U.S. Pat. Nos. 3,779,489 and 3,958,780. Heretofore these designs have been mutually exclusive.

The packing of a seat-mounted parachute requires that the canopy be removed from the seat for inspection and repacking. The removal requires the removal of the risers from the canopy. The risers in this type of parachute mounting remain with the seat.

Further, when deployed, the parachute canopy pulls the risers from the seat at a high velocity. Lanyards and other lines tend to become entangled in the riser support mechanism.

SUMMARY OF THE INVENTION

The invention provides a releasable control line which may be unfastened to permit parachute canopy removal. A flat compact mounting of the control line with the risers in a sheath minimizes entanglement by mounting hardware.

It is accordingly an object of this invention to provide an improved parachute construction.

Another object of this invention is to provide a convertible parachute construction for use in seat-mounted parachutes.

Yet another object is to provide an improved riser with a shrouded control line secured thereto.

These and other objects of the invention will become apparent with reference to the following description, claims, and drawings in which like parts have like numbers and;

BRIEF DESCRIPTION OF THE DRAWINGS

FIG. 2 is a view of the riser and lanyard mounting,

FIG. 2A showing a pair of risers flatly engaged and FIG. 2B showing the risers separated;

FIG. 4 is a view of the canopy package showing the control line placement.

DESCRIPTION OF THE PREFERRED EMBODIMENT

Figure 1:
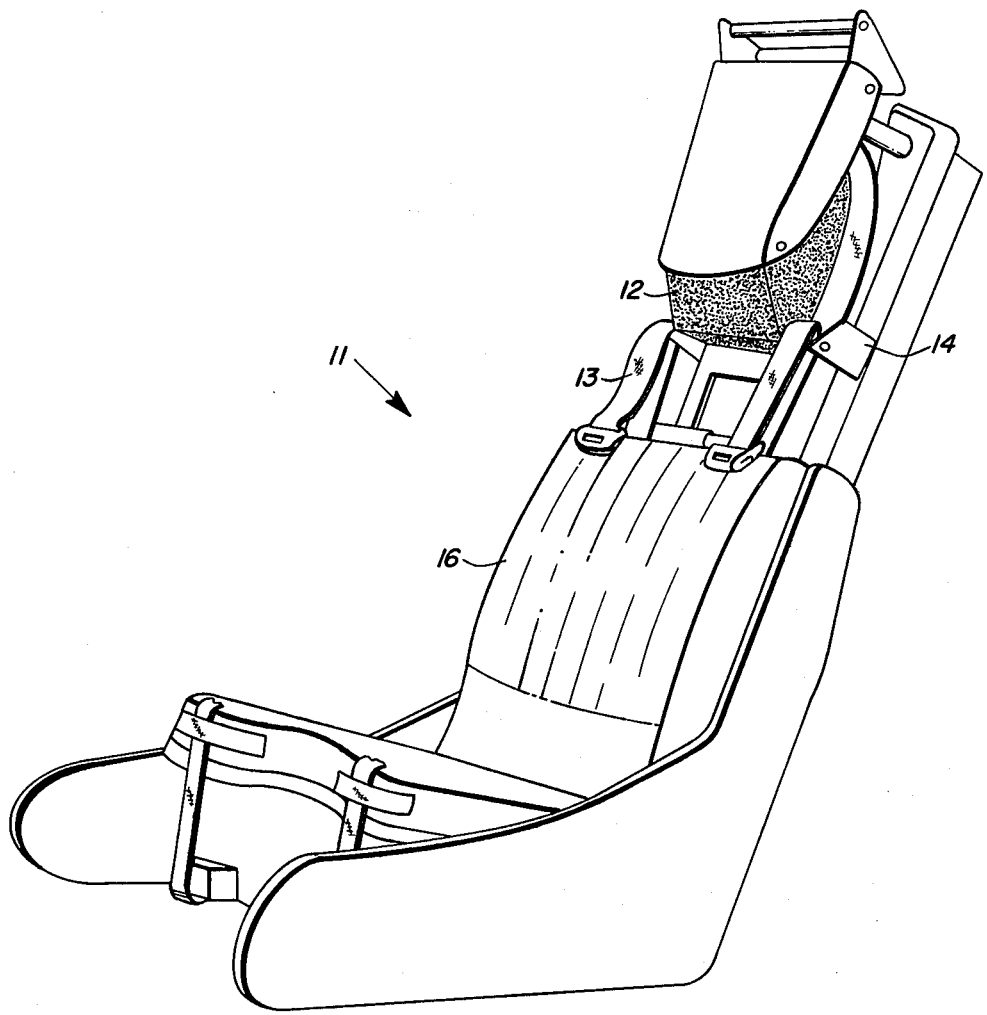
FIG. 1 is a view of the environment of the invention.

Referring to FIG. 1, an aircraft ejection seat is shown generally at 11. Seat 11, for purposes of illustration, is shown without many life support and operational attachments which are conventionally attached thereto. In its upper extremity, a parachute pack 12 is secured. The riser assembly for parachute 12 is held to seat 11 by a conventional mechanism, not shown, and terminates in shoulder straps 13 which pass through riser rollers shown at 14 and are secured beneath seat back 16.

Referring to FIG. 2, the riser assembly according to the invention is shown separated from the seat for greater clarity. Shoulder straps 13 are connected to a main riser 17. Additional restraint straps 18 are firmly attached to the back of the seat at a point not shown. Upon deployment of the parachute 12, retaining straps 18 are severed by an automatic guillotine knife, not shown, which forms a part of aircraft seat 11.

A lanyard 19 has an end formed in a loop and is held to main riser 17 by means of a web sheath 21. Web sheath 21 is sewn along part of its length to main riser 17, but is attached for the remainder thereof by two marginal strips 22 of pressure-releasable hook and pile fabric material. A variety of such hook and pile fabric materials are known and may be used following normal engineering trade-offs, however, that marketed under the trade name of Velcro has proven satisfactory in developmental models.

Main riser 17 splits into a rear riser or riser strap 23 and a front riser or riser strap 24 at a junction point 25. Such a construction arrangement is conventional in parachute harness manufacture. Rear riser 23 and front riser 24 are held together with lateral strips of pressure attachment material 22 in a similar fashion to web sheath 21. Rear riser straps 23 and front riser straps 24 are attached to the parachute shrouds 26 by conventional links 27. The control or operating line 28 operates the control mechanism which may be a conventional four line release or a four line extender such as shown in U.S. Pat. Nos. 3,779,489 and 3,958,780 issued to Matsuo on Dec. 18, 1973 and May 25, 1976 respectively. Control line 28 is terminated by a speed link 29 which attaches to lanyard 19 permitting the parachute canopy 12 to be selectively removed from front and rear risers 23 and 24.

Figure 3:
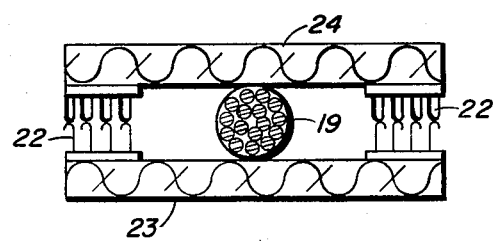
FIG. 3 is a sectional view along line 3—3 of FIG. 2.

Referring to FIGS. 2A and 3, the placing of lanyard 19 between rear riser 23 and front riser 24 is illustrated. Although exaggerated for the purposes of clarity, FIG. 3 illustrates the flat configuration possible permitting the combined riser assembly to pass through the riser yoke rollers 14 without danger of snagging or malfunction.

Referring to FIG. 4, the parachute pack 12 is seen to comprise a molded plastic case 31 and a tight-fitting lid 32. Lid 32 and case 31 are contoured at the point of closure to permit links 27 to extend therefrom such that rear riser 23 and front riser 24 may be conveniently attached thereto. Control line 28 is thus positioned to extend between the risers, placing ring 29 in position to engage with lanyard 19.

In operation, when parachute 12 deploys, risers 23 and 24 are withdrawn from behind seat back 16. The opening of the canopy also separates front riser 24 from rear riser 23 as shown in FIG. 2B, freeing lanyard 19 from that portion of its encasement. The aircrew member may reach up and grasp lanyard 19 and pull it downward to effect line release and lengthening. As lanyard 19 is drawn downward, speed link 29 comes to the forward or upper end of sheath 21. The pressure fastening material 22 separates to allow ring 29 to be drawn downward without interference or binding. This opening feature prevents binding or jamming by speed link 29 and facilitates the conversion of the parachute from the hemispherical to the gliding configuration, well understood in the art.

The foregoing description, taken together with the appended claims and drawings, constitutes a disclosure sufficient to enable one versed in the parachute manufacturing arts, having the benefit of the teachings thereof, to make and use the invention.

We claim:

1. In a riser assembly for use with a parachute and having:
   a main riser which extends, upon deployment of the parachute, upwardly to a junction point;
   a pair of risers which, prior to said deployment are in flatly engaged relation, and which, upon said deployment, extend upwardly and in divergent relation from said junction point toward individual attachments for parachute shrouds; and
   a lanyard which extends, upon said deployment, upwardly along the main riser past said junction point and along one riser of said pair toward the attachment corresponding to said one riser,
the improvement comprising:
   first means disposed in strips for releasably interconnecting the risers of said pair when in said flatly engaged relation, the strips of said first means extending along the lateral edges of the risers of said pair;
   a sheath which, upon said deployment, extends downwardly of said junction point along the main riser; and
   second means disposed in strips for releasably interconnecting the sheath to the main riser, the strips of said second means extending along the lateral edges of the main riser and, extending, prior to said deployment, between the main riser and the sheath,
so that, prior to said deployment, the lanyard is extendable sequentially:
   centrally between the strips of said second means, the sheath, and the main riser;
   around said junction point laterally of the risers; and
   between the strips of said first means and the risers of said pair
to avoid entanglement of the lanyard during said deployment.

2. The improvement of claim 1 wherein the strips of said first means and the strips of said second means are constructed of pressure fastening and pressure releasable hook and pile fabric material.

* * * * *